United States Patent
Neutsch (10) Patent No.: US 10,731,671 B2
(45) Date of Patent: Aug. 4, 2020

(54) COMPENSATION RESERVOIR

(71) Applicant: Gustav Magenwirth GmbH & Co. KG, Bad Urach (DE)

(72) Inventor: Christian Neutsch, Reutlingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 729 days.

(21) Appl. No.: 15/198,726

(22) Filed: Jun. 30, 2016

(65) Prior Publication Data

US 2017/0002841 A1 Jan. 5, 2017

(30) Foreign Application Priority Data

Jul. 2, 2015 (DE) .................. 10 2015 110 723

(51) Int. Cl.
| | |
|---|---|
| *F15B 1/26* | (2006.01) |
| *B60T 17/06* | (2006.01) |
| *B60T 11/26* | (2006.01) |
| *B62L 3/02* | (2006.01) |
| *F15B 7/08* | (2006.01) |
| *F16D 25/12* | (2006.01) |

(52) U.S. Cl.
CPC ............... *F15B 1/26* (2013.01); *B60T 11/26* (2013.01); *B60T 17/06* (2013.01); *B62L 3/023* (2013.01); *F15B 7/08* (2013.01); *F16D 25/12* (2013.01)

(58) Field of Classification Search
CPC ........ B60T 11/16; B60T 11/26; B60T 17/225; B60T 11/22; B60T 17/06; B62L 3/023
See application file for complete search history.

(56) References Cited

U.S. PATENT DOCUMENTS

| | | | |
|---|---|---|---|
| 6,763,808 B2 * | 7/2004 | Ryuzaki ................. | F02M 59/08 123/446 |
| 6,892,537 B1 | 5/2005 | Hurwic | |

(Continued)

FOREIGN PATENT DOCUMENTS

| | | |
|---|---|---|
| DE | 1909001 A1 | 9/1970 |
| DE | 60301763 | 7/2006 |

(Continued)

*Primary Examiner* — Abiy Teka
(74) *Attorney, Agent, or Firm* — Reinhart Boerner Van Deuren P.C.

(57) ABSTRACT

In order to improve a compensation reservoir for a hydraulic operating system, in particular for a hydraulic brake system or a clutch system, comprising a housing in the interior of which a storage chamber which is provided for storing hydraulic medium is bounded by a separating element which changes its shape in accordance with a volume of the storage chamber, it is proposed that the housing engages over the separating element in all of its shapes, which correspond to possible volumes of the storage chamber, in a protective manner, that a filling level-indicating region of the separating element changes its position in the housing when the volume which is taken up by the hydraulic medium which is stored in the storage chamber changes, and this position in each case represents a filling level-indicating position, and that the filling level-indicating position which is situated within the housing is visible from outside the housing through a viewing region of the housing.

33 Claims, 9 Drawing Sheets

(56) References Cited

U.S. PATENT DOCUMENTS

| | | | | |
|---|---|---|---|---|
| 7,497,309 B2 * | 3/2009 | Chen | .................. | B62L 3/023 |
| | | | | 188/24.22 |
| 2004/0207250 A1 * | 10/2004 | Porchet | ................ | B60T 11/26 |
| | | | | 303/1 |
| 2015/0330523 A1 | 11/2015 | Ottmann et al. | | |

FOREIGN PATENT DOCUMENTS

| | | | | |
|---|---|---|---|---|
| DE | 102008006851 | | 8/2009 | |
| DE | 102008006851 A1 * | 8/2009 | ............. | B60T 11/26 |
| DE | 102009022888 | | 12/2010 | |
| DE | 102010009892 | | 5/2011 | |
| DE | 102013005375 | | 7/2014 | |

\* cited by examiner

COMPENSATION RESERVOIR

CROSS-REFERENCE TO RELATED PATENT APPLICATION

This patent application claims the benefit of German application No. 10 2015 110 723.6, filed Jul. 2, 2015, the teachings and disclosure of which are hereby incorporated in their entirety by reference thereto.

BACKGROUND OF THE INVENTION

The invention relates to a compensation reservoir for a hydraulic operating system, in particular a hydraulic brake system or a clutch system, comprising a housing in the interior of which a storage chamber which is provided for storing hydraulic medium is bounded by a separating element which changes its shape in accordance with a volume of the storage chamber.

Compensation reservoirs of this kind are known from the prior art.

However, the problem of being able to identify the magnitude of the volume of the storage chamber in as simple a manner as possible is encountered in the case of said compensation reservoirs.

In the case of a compensation reservoir of the kind described in the introductory part, this object is achieved, according to the invention, in that the housing engages over the separating element in all of its shapes, which correspond to possible volumes of the storage chamber, in a protective manner, in that a filling level-indicating region of the separating element changes its position in the housing when the volume which is taken up by the hydraulic medium which is stored in the storage chamber changes, and this position in each case represents a filling level-indicating position, and in that the filling level-indicating position which is situated within the housing is visible from outside the housing through a viewing region of the housing.

SUMMARY OF THE INVENTION

The advantage of the solution according to the invention is that the magnitude of the volume of the storage chamber can be detected solely by detecting the filling level-indicating position of the filling level-indicating region of the separating element, and that the separating element is also protected by the housing against external damage by virtue of the solution according to the invention.

This provides a simple way of detecting the volume of the storage chamber, specifically simply by detecting the filling level-indicating region of the separating element, and secondly nevertheless protects the separating element itself in an optimum manner by virtue of the housing.

A particularly expedient solution provides that the filling level-indicating position of the filling level-indicating region of the separating element is represented by the shape of the filling level-indicating region.

By way of example, the shape of the filling level-indicating region of the separating element can be detected by the degree of curvature of the separating element in the interior of the housing.

In this case, it is particularly expedient when the filling level-indicating position of the filling level-indicating region of the separating element is represented by a relative position in relation to a marking or boundary of the viewing region, so that a person who detects the filling level-indicating position can detect the relative position of the filling level-indicating position in a simple manner in relation to this marking or boundary of the viewing region.

However, it is also feasible to subdivide the viewing region into a plurality of subregions and, for example, to detect that subregion of the viewing region in which the filling level-indicating position is visible, wherein a specific volume of the storage chamber is associated with the respective subregion.

However, as an alternative to this, it is also feasible to provide a scale in the viewing region and to assign different magnitudes of volume to individual scale elements, so that the magnitude of the volume of the storage chamber can be detected by comparing the filling level-indicating position with the scale.

Up until now, no detailed information has been provided in respect of the arrangement of the separating element within the housing.

By way of example, the separating element itself could be in the form of a bladder within the interior and the size of the bladder could represent the filling level-indicating position of the said bladder.

However, a particularly expedient solution provides that the separating element is connected to a base element of the housing.

In this case, it is preferably provided that the storage chamber is surrounded by the separating element and the base element.

That is to say that, in this case, the separating element changes its shape in accordance with the magnitude of the volume of the storage chamber, starting from the base element.

By way of example, an advantageous solution in this respect proposes that a region of the base element is of tub-like design and the tub interior forms a subchamber of the storage chamber, wherein, in particular, this subchamber is supplemented with a further subchamber which is bordered by the separating element adjoining the tub interior, so that the two subchambers together produce the storage chamber.

In order to be able to integrate the base element into the housing in a particularly simple manner, it is preferably provided that a wall attachment of the base element, which wall attachment runs around a housing axis in a closed manner, forms a base region of a side wall of the housing.

Up until now, no detailed information has been provided in respect of the arrangement of the viewing region of the housing.

It is therefore preferably provided that the viewing region of the housing is arranged such that an expansion chamber for the separating element, which expansion chamber is provided in the housing, is visible.

As a result, it is possible to detect all of the filling level-indicating positions of the separating element which are situated within the expansion chamber.

In this case, the expansion chamber is preferably arranged such that at least all of the filling level-indicating positions of the separating element which correspond to a volume of the storage chamber which is larger than the minimum volume lie within the expansion chamber, so that the said positions can be detected through the viewing region.

In this case, the viewing region of the housing can be a continuous region which is designed such that at least the filling level-indicating positions of all of the volumes of the storage chamber which correspond to a volume which is greater than the minimum volume can be detected.

However, it is also feasible to subdivide the viewing region into partial viewing regions through which different regions of the expansion chamber are visible.

In the simplest case, the viewing region can be a strip-like region.

A particularly simple solution provides that the viewing region of the housing surrounds the expansion chamber, so that the expansion chamber is visible on all sides.

In the embodiments in which the separating element is connected to the base element of the housing, it is preferably provided that the viewing region of the housing runs away from the base element in one direction of extent, so that all of the filling level-indicating positions of the separating element which correspond to a volume which is greater than the minimum volume can be detected and indicate the magnitude of the volume by virtue of their distance from the base element.

In a particularly preferred embodiment, it is provided that the viewing region comprises a UV filter, so that the separating element is advantageously protected against a damaging effect due to UV light.

In particular, the viewing region is substantially impermeable to UV light, that is to say that in particular at most 10%, preferably at most 5%, particularly preferably at most 1% of the UV light which strikes the viewing region is transmitted through the said viewing region, for example into the expansion chamber.

By way of example, the viewing region is substantially impermeable to electromagnetic radiation with a wavelength of less than 380 nm, in particular less than 360 nm, and/or to electromagnetic radiation with a wavelength of greater than 200 nm, in particular greater than 250 nm, for example greater than 280 nm, that is to say that at most 10%, preferably at most 5%, in particular at most 1%, of the electromagnetic radiation of this kind which is incident on the viewing region is transmitted through the viewing region, in particular into the expansion region.

In particular, the viewing region is composed of a material which absorbs UV light.

Up until now, no detailed information has been provided in respect of the configuration of the housing.

A solution which can be realized in a structurally particularly simple manner therefore provides that the expansion chamber is surrounded by a side wall element of the housing.

In order to form the viewing region, it is expediently provided in this case that the side wall element is partially transparent.

As an alternative to this, it is provided that the side wall element is completely transparent.

In a particularly preferred embodiment, it is provided that the side wall element comprises at least one transparent insert which, at least partially, forms the viewing region.

In particular, the at least one transparent insert is transparent to visible light.

Therefore, the at least one transparent insert is preferably substantially permeable to electromagnetic radiation with a wavelength of greater than 380 nm, in particular greater than 400 nm, and/or to electromagnetic radiation with a wavelength of less than 800 nm, in particular less than 780 nm, for example less than 750 nm, wherein the at least one transparent insert is substantially permeable to electromagnetic radiation of this kind when, in particular, at least 90%, preferably at least 95%, in particular at least 99%, of the electromagnetic radiation of this kind which is incident on the at least one transparent insert is transmitted through the said insert.

It is particularly preferred when the at least one transparent insert is substantially impermeable to UV light, wherein the at least one transparent insert is substantially impermeable to UV light when at most 10%, in particular at most 5%, preferably at most 1%, of the UV light which is incident on the at least one transparent insert, that is to say, for example, incident electromagnetic radiation with a wavelength of less than 380 nm, in particular less than 360 nm, and/or incident electromagnetic radiation with a wavelength of greater than 200 nm, in particular greater than 250 nm, for example greater than 280 nm, is transmitted through the at least one transparent insert.

A further alternative solution provides, for example, that the side wall element has apertures through which the equalizing chamber is visible.

No further information in respect of the design of the separating element itself has been provided in connection with the prior explanation of the individual embodiments.

A particularly expedient solution therefore provides that the separating element comprises a diaphragm body which is in the form of a dimensionally variable diaphragm or in the form of a bellows.

Furthermore, it is preferably provided that the separating element comprises a sealing body which seals off the storage chamber at the transition between the separating element and the housing.

In this case, the sealing body can be provided in addition to the diaphragm body, for example as two bodies which are arranged adjacent to one another in particular.

A particularly advantageous solution provides that the sealing body and the diaphragm body are integrally formed.

Furthermore, the sealing body can be in the form of, for example, an O-ring seal which is entirely deformed for sealing-off purposes.

It is particularly advantageous when a bead region of the sealing body is arranged on the diaphragm body by way of a connecting section of the sealing body.

In this case, the bead region of the sealing body is, in particular, of voluminous design, so that the said bead region provides a large amount of sealing material and is readily compressible and therefore the transition between the separating element and the housing is sealed off in a particularly expedient manner.

In particular, the bead region is thicker than the connecting section, for example the bead region is thicker than the connecting section in respect of a cross section which runs from the interior of the housing to outside the housing.

A particularly expedient solution provides that the sealing body comprises at least one sealing lip for forming a sealing line since, owing to the design of a sealing line, improved sealing off itself is possible due to a lower amount of pressure being applied.

It is particularly expedient when the sealing body comprises a plurality of sealing lips for forming a sealing line in each case.

By way of example, the housing has a receptacle for the separating element, preferably for the sealing body of the separating element, in particular for the bead region of the sealing body.

It is particularly expedient when the side wall element has the receptacle for the separating element, preferably for the sealing body of the separating element.

In particular when sealing off between the separating element and the base element, it is preferably provided that the base element has a receptacle for the sealing body of the separating element.

In this case, the receptacle can be designed in an extremely varied way.

By way of example, the base element can have a step-like receptacle.

A solution which is particularly expedient in respect of sealing off which is as optimal as possible provides that the receptacle is designed in the form of a channel.

In this case, the channel can have any desired cross section, for example a semicircular or a rectangular cross section.

In this case, it is particularly advantageous when the at least one sealing lip or the plurality of sealing lips bear against wall regions of the channel for the purpose of forming sealing lines.

In a particularly advantageous embodiment, it is provided that the sealing body is acted on by at least one pressure element, as a result of which particularly effective sealing off is achieved in an advantageous manner.

In particular, it is provided that the sealing body is acted on by at least two pressure elements, as a result of which redundant sealing off is provided.

By way of example, the sealing body is acted on by two pressure elements.

It is particularly expedient when the bead region of the sealing body is acted on by at least one pressure element since the said bead region provides a large amount of sealing material for pressing and sealing, and therefore particularly expedient sealing off is achieved.

By way of example, the connecting section of the sealing body is acted on by at least one pressure element.

In order to achieve particularly optimal sealing off, it is preferably provided that the sealing body in the receptacle is acted on by a pressure element and is deformed in relation to the state in which it is not acted on in order to thereby improve sealing off in the receptacle.

Up until now, no further information has been provided in respect of the design of the pressure element.

By way of example, it is feasible to provide the pressure element as a separate element.

A solution which is structurally particularly simple and also expedient for assembly provides that the pressure element is held against the side wall element.

By way of example, the pressure element is in the form of a projection of the side wall element or in the form of an extension of the side wall element in this case.

In particular, it is expedient in this case when the pressure element and the side wall element are integrally formed.

Particularly when the sealing body comprises at least one sealing lip or a plurality of sealing lips, it is preferably provided that the at least one sealing lip bears against the receptacle in a sealing manner by virtue of the sealing body being acted on.

It is even more advantageous when the plurality of sealing lips bear against the receptacle in a sealing manner by virtue of the sealing body being acted on.

In a particularly advantageous embodiment, it is provided that the compensation reservoir is integrated into the brake fitting of a vehicle, in particular into the brake fitting of a steering device-controlled vehicle.

The invention further relates to a brake fitting of a vehicle, in particular the brake fitting of a steering device-controlled vehicle.

In particular, the brake fitting is provided for a quad bike and/or a two-wheeled vehicle, for example a pedelec, a bicycle or a motorcycle.

A portion of a hydraulic operating system is integrated into a fitting housing of the brake fitting, wherein the hydraulic operating system comprises a master cylinder, a brake cylinder and a compensation reservoir.

By way of example, the brake fitting comprises a loading device for the master cylinder.

In particular, it is provided that the fitting housing at least partially forms a housing of the master cylinder.

In this case, the compensation reservoir which is integrated into the brake fitting comprises one or more of the abovementioned features.

It is particularly preferred when the fitting housing forms a portion of a housing of the compensation reservoir.

By way of example, the fitting housing forms a base element of the compensation reservoir.

Further features and advantages of the solution according to the invention are the subject matter of the following description and the drawing showing a number of exemplary embodiments.

DETAILED DESCRIPTION OF THE INVENTION

Figure 1:
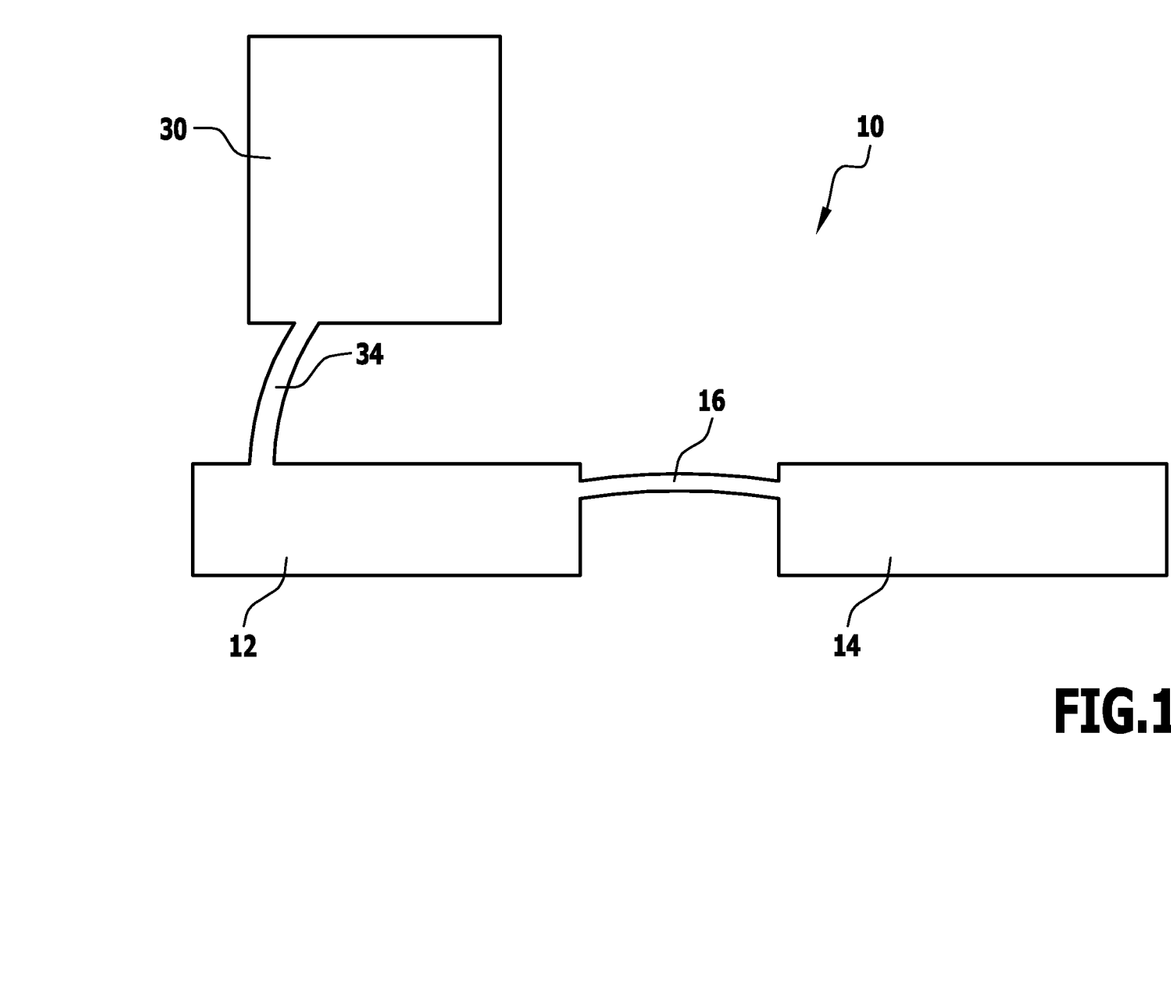
FIG. 1 shows a schematic illustration of a hydraulic operating system.

A hydraulic operating system which is schematically illustrated in FIG. 1 and is designated 10 overall, for example for a vehicle, for example a quad bike or a two-wheeled vehicle, in particular a pedelec, a bicycle or else a motorcycle, comprises a master cylinder 12 which is integrated, for example, in a brake fitting for a vehicle, for example a quad bike or a two-wheeled vehicle, in particular a pedelec, a bicycle or else a motorcycle, and an operating cylinder 14, wherein the master cylinder 12 supplies pressurized hydraulic medium to the operating cylinder 14 by means of a first hydraulic line 16, and also comprises a compensation reservoir 30 which is connected, for example, to the brake fitting or is integrated into the brake fitting and which is provided for storing and for providing hydraulic medium, in such a way that, as required, hydraulic medium from the hydraulic medium reservoir which is located in the compensation reservoir 30 enters the master cylinder 12 through second hydraulic line 34, which is connected to the compensation reservoir 30 and equalizes a deficiency in hydraulic medium in said master cylinder, and in this way the hydraulic operating system 10 and, in particular, the master cylinder 12 are always supplied with a sufficient amount of hydraulic medium.

Figure 2:
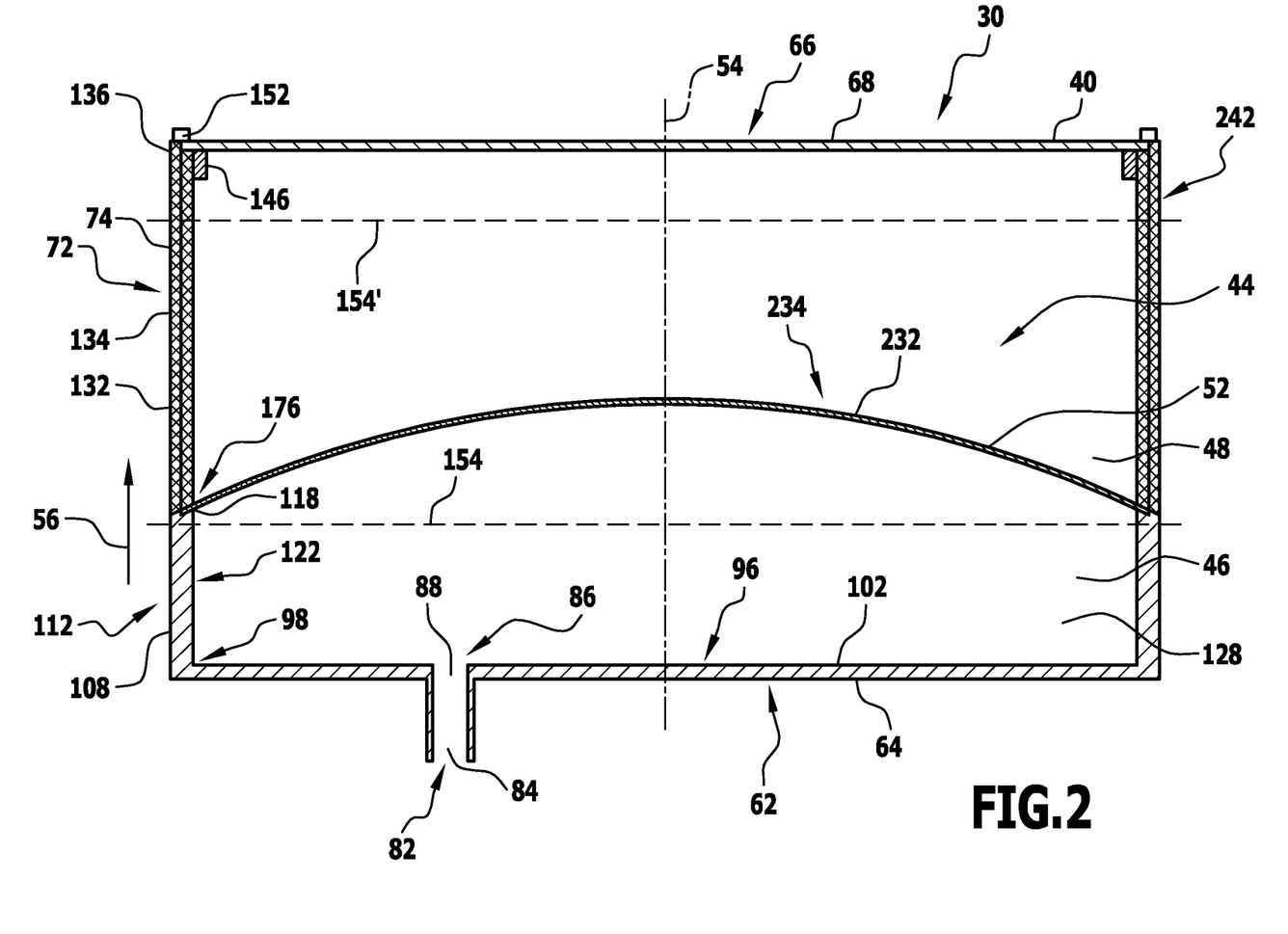
FIG. 2 shows a section through a first exemplary embodiment of a compensation reservoir according to the invention.

One exemplary embodiment of a compensation reservoir 30 according to the invention comprises a dimensionally stable housing which is designated 40 overall and is connected, for example, to the master cylinder 12 and is, for example, at least partially integrated into the brake fitting of the vehicle, for example of the quad bike or the two-wheeled vehicle, wherein a storage chamber 46 which is provided for storing hydraulic medium is arranged in an interior 44 of the housing 40, the volume of the said housing being defined without fluctuating by the boundary provided by the dimensionally stable housing 40 (FIG. 2).

The volume of the storage chamber 46 corresponds substantially to the volume of the hydraulic medium which is stored in the said storage chamber and is therefore subject to fluctuations which result, for example, from the inflow or outflow of hydraulic medium.

In the interior 44 of the housing 40, the storage chamber 46 is bounded by an at least partially dimensionally variable separating element 52, which is in the form of an elastic diaphragm or in the form of a bellows in particular, so that fluctuations in the volume of the storage chamber 46 cause a change in the shape of the separating element 52, and wherein the separating element 52 can expand, starting from a minimum volume of the storage chamber 46, to a maximum volume in the event of an increase in volume of the said storage chamber into an expansion chamber 48 which is provided in the interior 44 for this purpose, but the entire volume of the interior 44 which is bounded by the housing 40 remains unchanged in the process.

Owing to the arrangement of the separating element 52 in the interior 44 of the housing 40, the separating element 52 is protected by the housing 40 against external effects in an optimum manner.

The housing 40 extends along a housing axis 54 in the direction of a direction 56 of extent from a base element 64, which is arranged in a first housing end region 62 and which is arranged, for example, on the brake fitting of the vehicle, for example of the quad bike or of the two-wheeled vehicle, or in particular is integrated into the said brake fitting, to a cover element 68 which is arranged in a second housing end region 66, wherein an at least partially optically transparent side wall 74 is arranged in a housing intermediate region 72 which is situated between the first housing end region 62 and the second housing end region 66.

The base element 64 comprises an outlet, which is designated 82 overall, by means of which the storage chamber 46 is connected to the second hydraulic line 34, so that, as required, hydraulic medium passes from the storage chamber 46, via the outlet 82, into the second hydraulic line 34 and further enters the master cylinder 12.

In this embodiment, the outlet 82 comprises an outlet duct 84 which, in a first outlet end region 86, issues into the storage chamber 46 by means of an outlet opening 88 and, starting from the first outlet end region 86, opens into the second hydraulic line 34.

The base element 64 bounds the storage chamber 46 in a first boundary region 96, wherein the first boundary region 96 is surrounded by a first boundary contour 98 and, for example, the first boundary region 96 forms a, in particular substantially planar, boundary base area 102 of the base element 64 for the storage chamber 46.

In this exemplary embodiment, the base element 64 has a wall attachment 108 which rises in the direction 56 of extent, in particular starting from the area which is spanned by the boundary base area 102, wherein, in particular, the wall attachment 108 is arranged in a base region 112 of the side wall 74.

The wall attachment 108 of the base element 64 is designed so as to run around the housing axis 54 in a closed manner.

In particular, the wall attachment 108 runs along the first boundary contour 98 and rises as far as a second boundary contour 118, so that the wall attachment 108 surrounds the storage chamber 46 along a second boundary region 122 which is situated between the first boundary contour 98 and the second boundary contour 118.

The base element 64 is preferably of tub-like design in one region, wherein the first boundary region 96 forms the tub base and the second boundary region 122 forms the tub wall, and the tub interior 128 which is enclosed by the tub which is formed in this way forms a subchamber of the storage chamber 46.

In this exemplary embodiment, a side wall element 132 between the base element 64 and the cover element 68 forms a side wall intermediate region 134 of the side wall 74.

In particular, the side wall element 132 adjoins the base element 64 in a flush manner at the second boundary contour 118 and adjoins the cover element 68 in a flush manner at a third boundary contour 136.

By way of example, an integral design of the side wall element 132 and the cover element 68 is also possible.

The cover element 68 closes off the housing 40 in the second housing end region 66.

By way of example, the cover element 68 substantially has the geometric shape of the boundary base area 102 of the base element 64.

The cover element 68 is situated either in a flat geometric area, in particular which is free of raised portions, or in a curved geometric area, in particular which is free of raised portions.

It is also feasible for a region of the cover element 68 to form a region of the side wall 74.

A projection 146 is advantageously arranged on the cover element 68 in a region of the third boundary contour 136, in particular along the third boundary contour 136, so as to run around the housing axis 54 in a closed manner, so that the projection 146 forms a stop for the side wall element 132, which stop prevents a relative change in position transverse to the housing axis 54 between the cover element 68 and the side wall element 132.

A fastening element 152, which is in the form of a tie rod or in the form of a screw for example, connects the base element 64, the side wall element 132 and the cover element 68 in such a way that the positions of these elements relative to one another are fixed.

If the cover element 68 and the side wall element 132 are optionally of integral design and therefore connected to one another, it is also possible for the fastening element 152 to connect the base element 64 only to the cover element 68 or the side wall element 132, so that the positions of these elements are likewise fixed relative to one another in this way.

In this embodiment, the housing 40 is formed in such a way that geometric cross-sectional regions, which are produced by the geometric sectioning of the housing 40 with geometric cross-sectional areas which are situated one above the other in the direction 56 of extent, wherein the cross-sectional areas 154 and 154' which are illustrated by way of example in FIG. 2 are perpendicular to the plane of the illustration, have a substantially identical geometric, for example substantially rectangular, ellipsoidal or circular, shape, wherein shapes which are substantially identical are intended to be understood to mean, in particular, shapes which can be mapped onto one another by stretching.

As already mentioned, the separating element 52 is arranged on the housing 40 in such a way that the separating element 52 separates the storage chamber 46 from the expansion chamber 48 in the interior 44 of the housing 40, in particular in a media-tight manner, so that, in particular, no hydraulic medium can escape from the storage chamber 46 into the expansion chamber 48 and, for example, no air can enter the storage chamber 46 from the expansion chamber 48.

By way of example, the separating element 52 arches in the shape of a bell over the base element 64, in particular over the tub interior 128, and the storage chamber 46 extends from the base element 64 as far as the separating element 52, so that the base element 64 and the separating element 52 surround the storage chamber 46 in a closed manner.

The separating element 52 is preferably held between the base element 64 and the side wall element 132 and forms a media-tight, in particular air-tight and hydraulic medium-tight, termination 176 for the storage chamber 46 with the base element 64.

Figure 3:
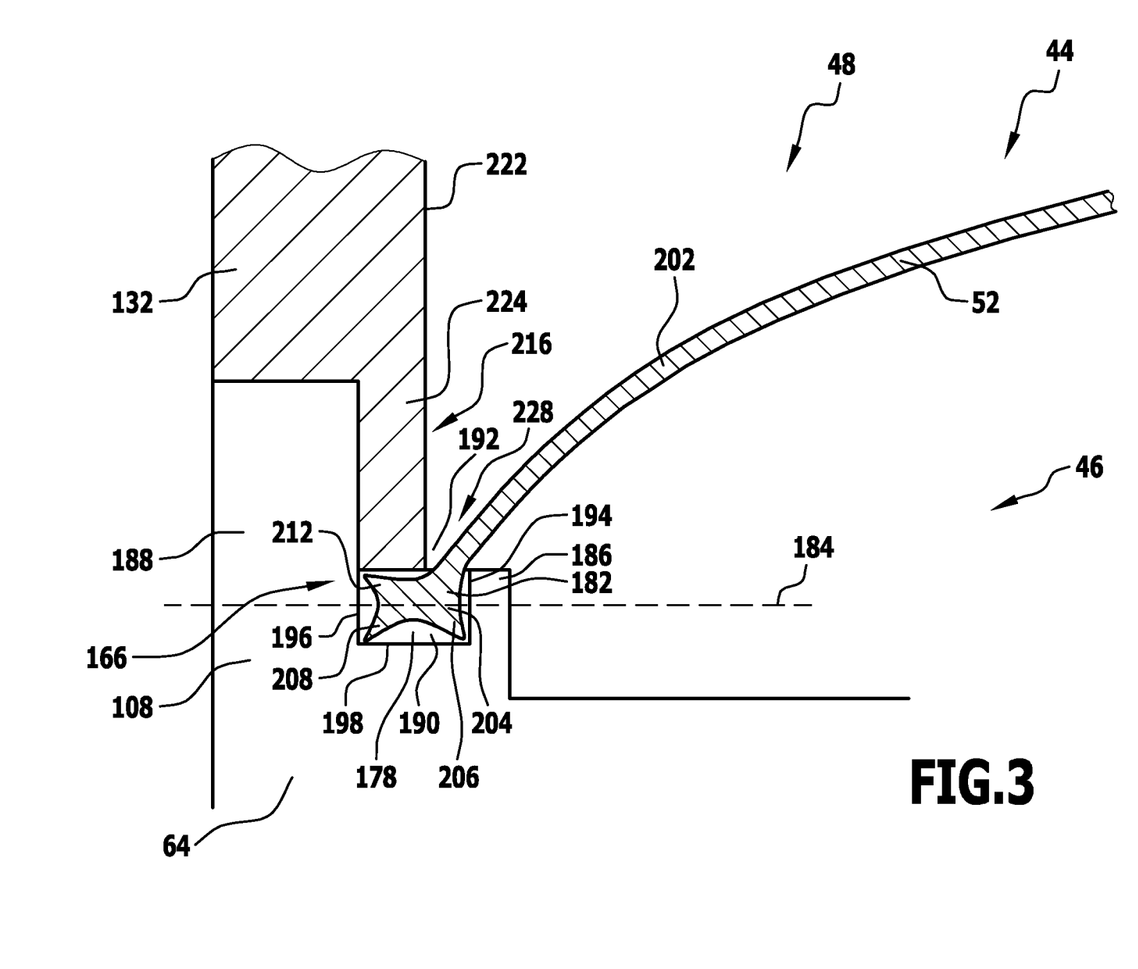
FIG. 3 shows an illustration, in the form of an enlarged detail, of the compensation reservoir according to FIG. 2 in a region of a receptacle of a base element.

In this exemplary embodiment, the base element 64, in particular the wall attachment 108, comprises a receptacle 178 which runs around the housing axis 54 in a closed manner and is arranged, for example, either along the first boundary contour 98 or along the second boundary contour 118, for a sealing body of the separating element 52, which sealing body is designated 182 overall, the interaction between the said sealing body and the said receptacle 178 allowing the media-tight termination 176 to be formed (FIG. 2, in the form of an enlarged detail in FIG. 3).

By way of example, the receptacle 178 is situated in a receptacle plane 184 which runs perpendicular to the housing axis 54.

The receptacle 178 which is arranged, in particular, between an inner side wall section 186 and an outer side wall section 188 is designed in the form of a channel, which is designated 190 overall, which has a channel opening 192 which is averted from the base element 64 and, in particular, faces the cover element 68 or the side wall element 132, and, starting from the said channel opening, an inner channel wall 194 and an outer channel wall 196 and also a channel base 198.

The sealing body 182, which is of annular design and borders the circumference of an at least partially dimensionally variable, in particular an entirely dimensionally variable, diaphragm body 202 of the separating element 52 and, in particular, is integrally formed on the diaphragm body 202, is situated in the channel 190.

The channel 190 receives the sealing body 182, which is designed so as to correspond to the channel 190 in respect of its shape, so as to terminate with it in a sealing manner.

The sealing body 182 of the dimensionally variable separating element 52 comprises a plurality of sealing lips 206, 208, 212 which are braced by an inner body 204.

In particular, two of the sealing lips 206, 208, 212 are designed such that they bear against the channel base 198 and/or against the inner channel wall 194 or against the outer channel wall 196 or, in particular, in an edge which is formed by the inner channel wall 194 or the outer channel wall 196 with the channel base 198, and a further of the sealing lips 206, 208, 212 rests against the outer channel wall 196 at a distance from the channel base 198, so that preferably a total of three sealing lines are formed between the sealing body 182 and the base element 64, the said sealing lines forming a reliable media-tight termination 176.

A pressure element 216, for example a shoulder 224 which is arranged on that side 222 of the side wall element 132 which faces the interior 44, acts on the sealing body 182 in an engaging manner, in particular through the channel opening 192, and, when the housing 40 is closed by means of the fastening element 152, for example a screw-connection of the housing 40 by means of the fastening element 152 which is in the form of a screw, presses the sealing body 182 into the channel 190, so that the plurality of sealing lips 206, 208, 212 spread and form sealing lines, which terminate in a sealing manner, along the channel base 198 or the inner channel wall 194 or the outer channel wall 196.

The diaphragm body 202 which is connected to the sealing body 182 in a manner extending through a gap 228 between the pressure element 216 and the channel 190, for example produced by the shoulder 224 engaging only partially over the channel 190 in the radial direction in relation to the direction 56 of extent, extends from the sealing body 182 over the storage chamber 46 and engages over, in particular, the first boundary region 96 of the base element 64 and possibly the second boundary region 122 of the base element 64.

In a filling level-indicating region 232 of the separating element 52, in particular of the diaphragm body 202, the separating element 52 is of flexible design, so that in the event of a change in volume of the hydraulic medium which is stored in the storage chamber 46, the said change in volume being caused by hydraulic medium flowing out through the outlet 82 for example, the filling level-indicating region 232 changes a filling level-indicating position 234 which indicates the respective filling level of stored hydraulic medium in the storage chamber 46.

By way of example, the degree of curvature in the direction away from the base element 64 or in the direction of the base element 64 of the filling level-indicating region 232 gives the filling level of the hydraulic medium which is stored in the storage chamber 46, so that the degree of curvature of the filling level-indicating region 232 represents the filling level-indicating position 234.

By way of example, it is also feasible for the position of the filling level-indicating region 232 to represent the filling level-indicating position 234 relative to a scale, in particular the distance from the filling level-indicating region 232 to the receptacle plane 184.

In particular, a minimum filling level-indicating position of the filling level-indicating region 232 which the filling level-indicating position 234 moves to when the filling level of stored hydraulic medium in the storage chamber 46 reaches a predefined minimum filling level can be provided.

By way of example, the filling level-indicating region 232 signals, when it extends into the receptacle plane 184 and no longer arches over said receptacle plane or is no longer at a distance from the receptacle plane 184, that the filling level of the stored hydraulic medium in the storage chamber 46 has reached the minimum filling level.

By way of example, it is also feasible for the filling level-indicating region 232 to move to a maximum filling level-indicating position when the filling level of the stored hydraulic medium in the storage chamber 46 reaches a predefined maximum filling level. By way of example, the filling level-indicating region 232 signals, when it comes into contact with the side wall element 132 or the cover element 68, that the filling level of the stored hydraulic medium in the storage chamber 46 has reached the maximum filling level.

The filling level-indicating position 234 of the filling level-indicating region 232 is visible from outside the housing 40 through a transparent viewing region 242, which is arranged on the housing 40 in particular.

Various embodiments of the transparent viewing region 242 are possible.

By way of example, one element of the housing 40, in particular the side wall element 132 and/or the cover element 68 or else the base element 64, comprises a subregion which forms the transparent viewing region 242 and is of transparent design.

In this embodiment, the respective element of the housing 40, for example the side wall element 132 and/or the cover element 68 or else the base element 64, is formed entirely from a transparent material.

In this embodiment of the compensation reservoir 30, the viewing region 242 is formed by the side wall element 132 which, in particular, rises in the direction 56 of extent over the base element 64 and surrounds the expansion chamber 48.

Therefore, the viewing region 242 is situated in the housing intermediate region 72.

In particular, the transparent viewing region 242 extends away from the receptacle 178 in the direction of the direction 56 of extent, in particular away from the receptacle plane 184, starting from the base element 64.

The viewing region 242 preferably runs along the second boundary contour 118 and therefore entirely around the housing axis 54, so that the filling level-indicating region 232 of the separating element 52 can be identified from all sides.

By way of example, it is also feasible for the viewing region 242 to be arranged in an element of the housing 40, for example the side wall element 132 or else the cover element 68, and to be formed by one or more apertures in the respective element of the housing 40, wherein, in particular, a plurality of apertures which are at a distance from one another and are situated one above the other in the direction of the direction 56 of extent form a scale for reading off the filling level of the hydraulic medium which is stored in the storage chamber 46 by identifying the filling level-indicating position 234 through one of the apertures.

By way of example, one aperture indicates the minimum filling level in that, as long as a sufficient amount of hydraulic medium is stored in the storage chamber 46, at least one region of the separating element 52 is at a further distance from the base element 64, in particular from the receptacle plane 184, than the aperture, so that the filling level-indicating region 232 is visible through the aperture but, if the filling level of the hydraulic medium which is stored in the storage chamber 46 drops below the minimum filling level, the separating element 52, in particular the filling level-indicating region 232, is at a shorter distance from the base element 64, in particular from the receptacle plane 184, than the aperture, and therefore the filling level-indicating region 232 is no longer visible through the aperture and therefore the minimum filling level is indicated.

In summary, selected elements of the compensation reservoir 30 function as follows:

If hydraulic medium flows out of the storage chamber 46, via the outlet 82, into the second hydraulic line 34 in order to replace hydraulic medium in the hydraulic operating system 10, the volume of the hydraulic medium which is stored in the storage chamber 46 and consequently the shape and/or the relative position in relation to a marking of the flexible filling level-indicating region 232 of the separating element 52, in particular the degree of curvature of the filling level-indicating region 232, are reduced, so that the filling level-indicating position 234 of the filling level-indicating region 232 is changed.

Since the filling level-indicating position 234 of the filling level-indicating region 232 is visible through the viewing region 242 from outside the housing 40, the configuration according to the invention of the compensation reservoir 30 therefore firstly allows the filling level of the hydraulic medium which is stored in the storage chamber 46 to be read off by a user of the hydraulic operating system 10 from outside the housing 40, wherein secondly the storage chamber 46 is closed off in a media-tight manner in a simple fashion and the separating element 52 is protected by the housing 40 against external effects.

If the filling level of the hydraulic medium which is stored in the storage chamber 46 is reduced as far as the minimum filling level, the filling level-indicating position 234 of the filling level-indicating region 232 moves to the minimum-filling level-indicating position, for example formed by a specific degree of curvature of the filling level-indicating region 232, in particular by said region extending into the receptacle plane 184, or formed by reaching the filling level-indicating region 232 of a marking in the viewing region 242, for example the transition from the transparent base element 64 to the transparent side wall 74, and the user of the hydraulic operating system 10 is able to identify by virtue of this minimum-filling level-indicating position that the storage chamber 46 needs to be refilled with hydraulic medium.

In the case of a second exemplary embodiment of a solution according to the invention, those parts which are identical to those of the first exemplary embodiment are provided with the same reference symbols, so that reference can be made in full to the statements made in relation to the first exemplary embodiment for description of the said second exemplary embodiment.

Figure 4:
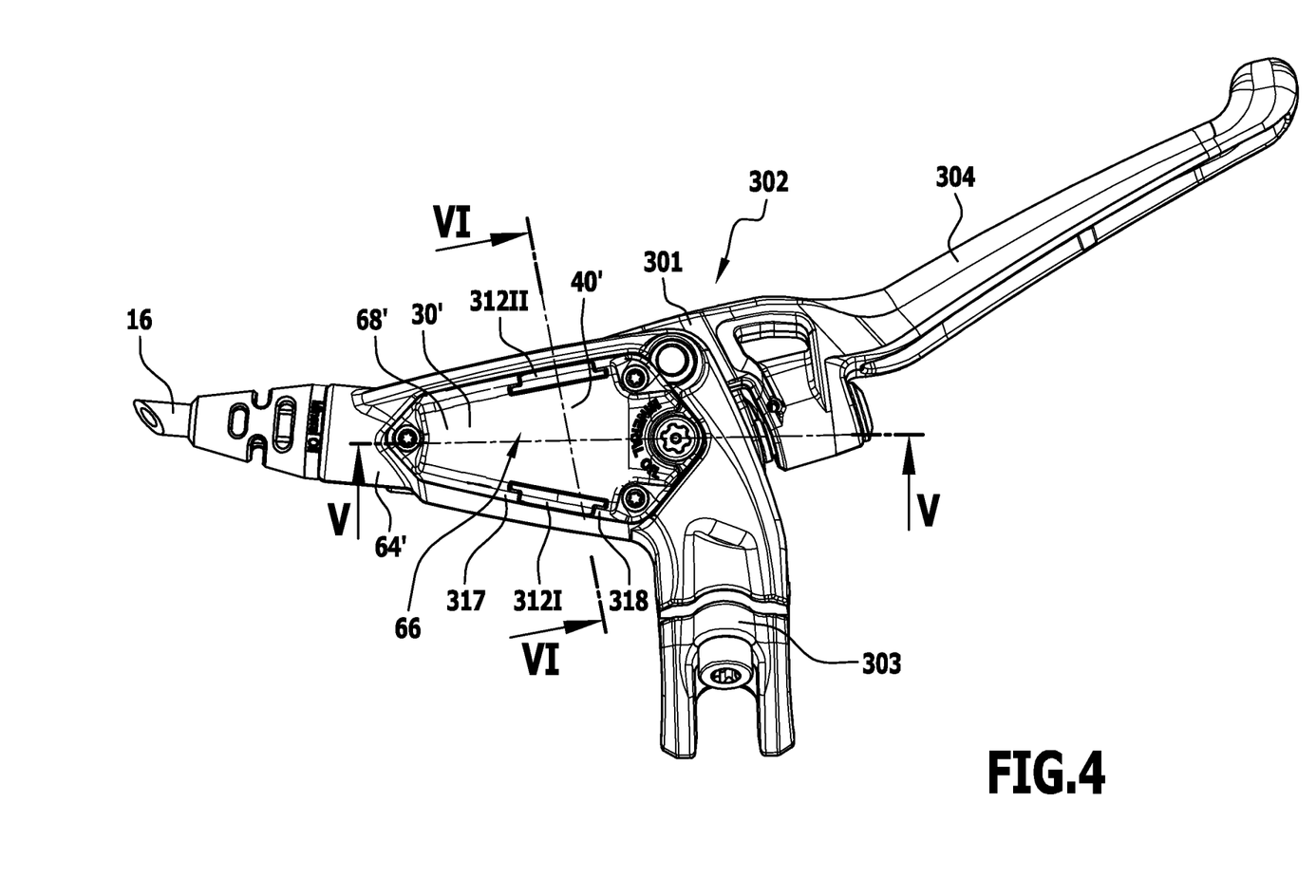
FIG. 4 shows an illustration of a brake fitting comprising a compensation reservoir according to a second exemplary embodiment of the solution according to the invention.
Figure 5:
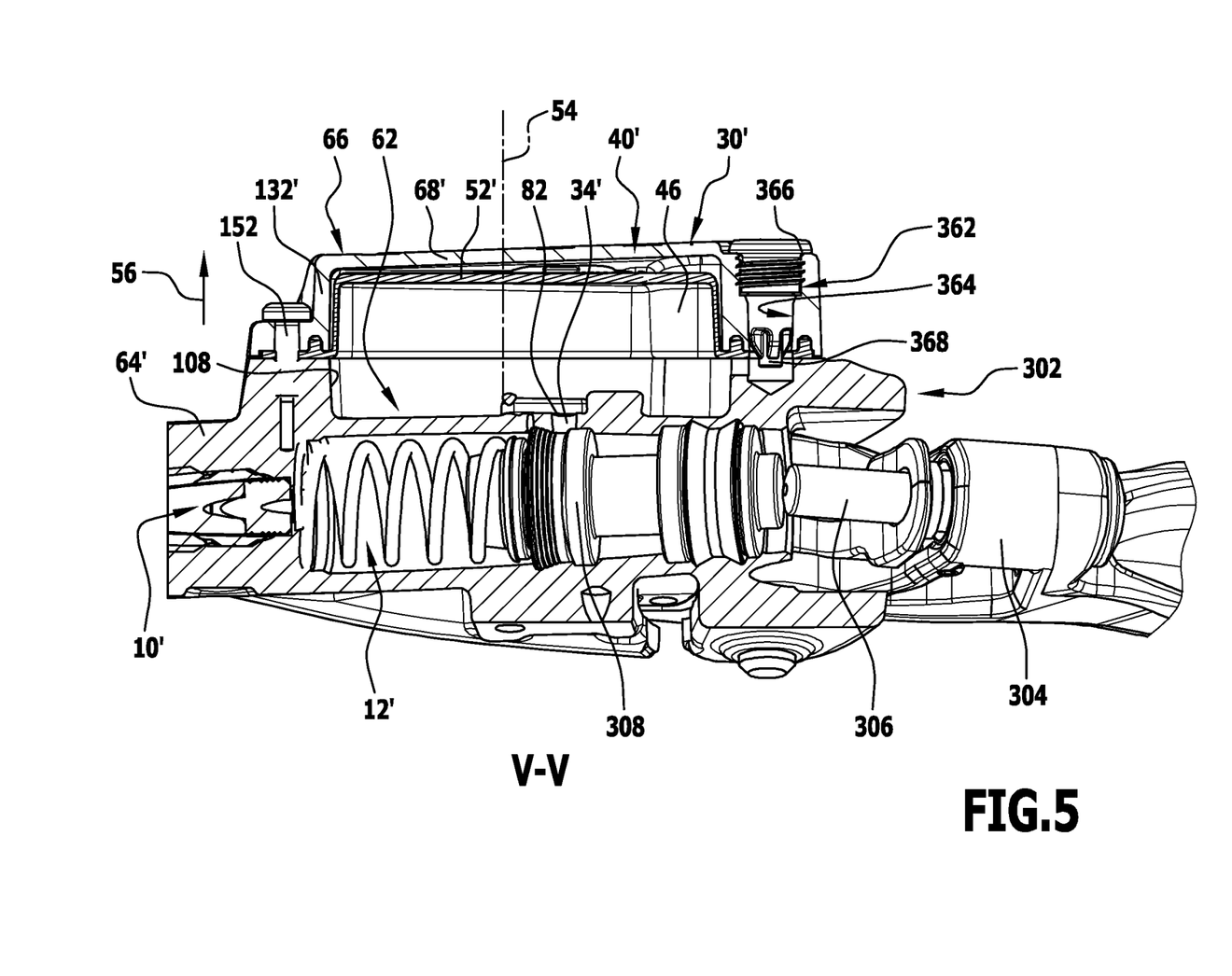
FIG. 5 shows a section V-V according to FIG. 4 through the brake fitting according to the second exemplary embodiment.

In the case of the second exemplary embodiment, a portion of a hydraulic operating system 10' is integrated into a fitting housing 301 of a brake fitting 302 (FIGS. 4 and 5).

The brake fitting 302 is provided for a vehicle, in particular for a steering device-controlled vehicle.

For the purpose of being arranged on the vehicle, the brake fitting 302 comprises a fastening apparatus 303, for example a portion of a screw connection.

A master cylinder 12' and a compensation reservoir 30' of the hydraulic operating system 10' are arranged in the fitting housing 301; in particular, the fitting housing 301 forms a housing of the master cylinder 12' and a housing 40' of the compensation reservoir 30' at least in regions.

A first hydraulic line 16, which connects the master cylinder 12' to an operating cylinder 14 of the hydraulic operating system 10' so as to carry fluid, can be connected to the brake fitting 302.

The brake fitting 302 further has a loading device 304 which, in this exemplary embodiment, comprises a brake lever which is arranged on the fitting housing 301.

The loading device 304 is connected to the master cylinder 12' so as to transmit force and, in the event of operation of the loading device 304, a loading element 306 of the loading device 304 acts on a piston 308 of the master cylinder 12'.

When the loading element 306 acts on the piston 308, the piston 308 is set into motion and acts on hydraulic medium which is provided in the hydraulic operating system 10'.

A second hydraulic line 34', which connects the master cylinder 12' and the compensation reservoir 30' in a fluid-carrying manner, is arranged in the brake fitting 302, in particular integrated into the fitting housing 301, in the manner of a duct.

The fitting housing 301 forms a base element 64' of the compensation reservoir 30'.

A wall attachment 108 of the base element 64' partially surrounds the interior 44, in particular the storage chamber 46 of the compensation reservoir 30'.

Figure 6:
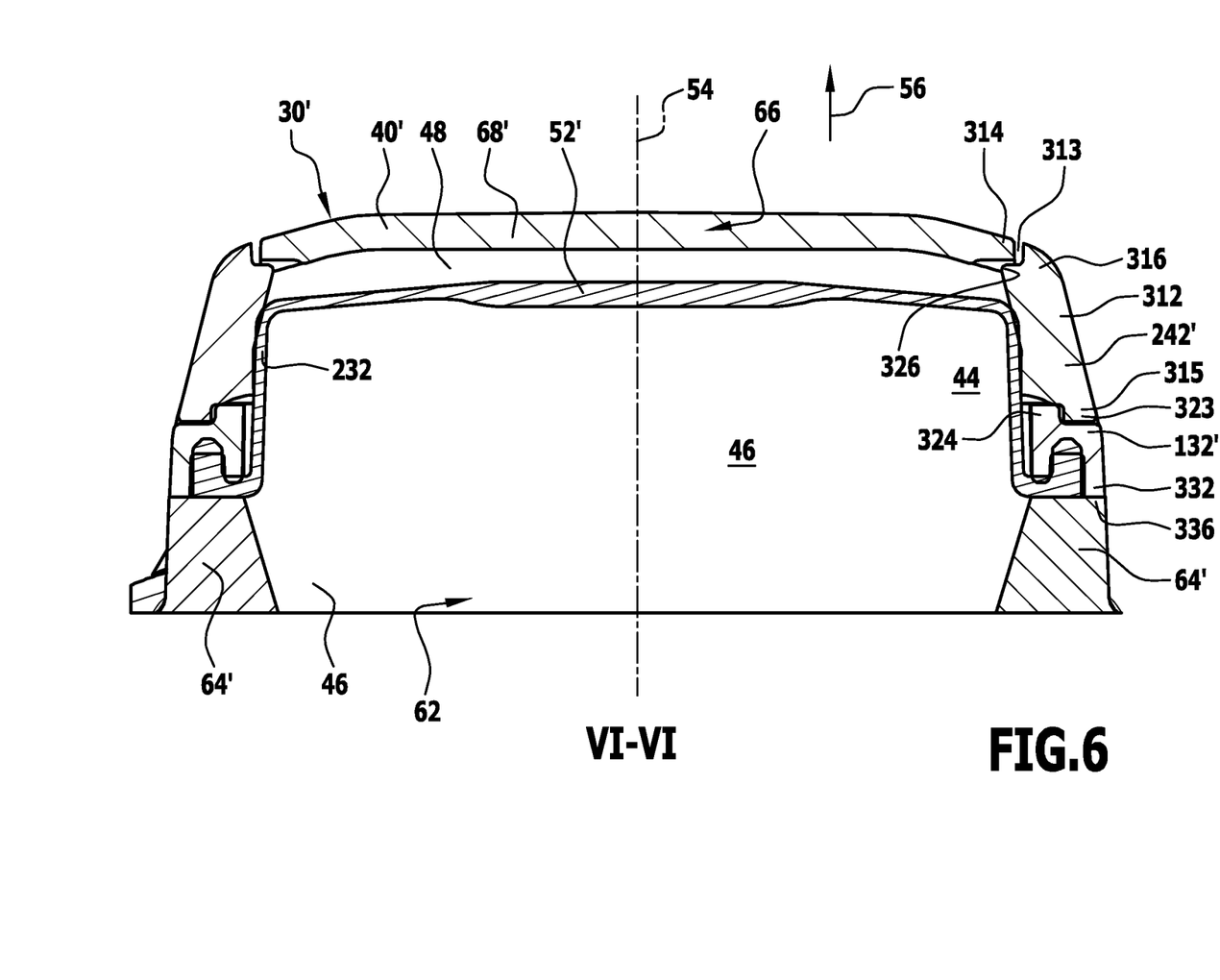
FIG. 6 shows a section VI-VI according to FIG. 4 through the compensation reservoir according to the second exemplary embodiment.

A cover element 68' of the compensation reservoir 30' firstly extends in the second housing end region 66 and, starting from this second housing end region, the cover element 68' secondly extends in the direction of the base element 64' and in the process partially surrounds the expansion chamber 48 (FIGS. 5 and 6).

Therefore, the cover element 68' likewise forms a side wall element 132'.

The cover element 68' and the side wall element 132' bound the expansion chamber 48 in the direction axial to the main axis 54 in the second housing end region 66 and border the expansion chamber 48 in the direction radial to the housing axis 54.

The side wall element 132' comprises a transparent insert 312 which forms a transparent viewing region 242'.

In this exemplary embodiment, a first transparent insert 312I and a second transparent insert 312II are provided, wherein, for example, the transparent inserts 312I and 312II are arranged on opposite sides of the side wall element 132'.

The transparent inserts 312I and 312II are of identical design, and therefore the said inserts are described jointly in the text which follows and explicit mention of the specifications I and II is dispensed with in the description of the said inserts.

The transparent insert 312 is permeable to visible light, so that the expansion chamber 48 is visible through the transparent insert 312.

A separating element 52' and also the filling level-indicating region 232 of the said separating element are also visible through the transparent insert 312.

The transparent insert 312 is formed from a UV light-absorbing material and is therefore substantially impermeable to UV light.

Therefore, the viewing region 242' comprises a UV filter.

By way of example, the transparent insert 312 is in the form of a separate portion of the side wall element 132'.

In this case, the transparent insert 312 can be inserted into a cutout 313 in the side wall element 132'.

The cutout 313 is bordered by a border 314 of the side wall element 132'.

Figure 7:
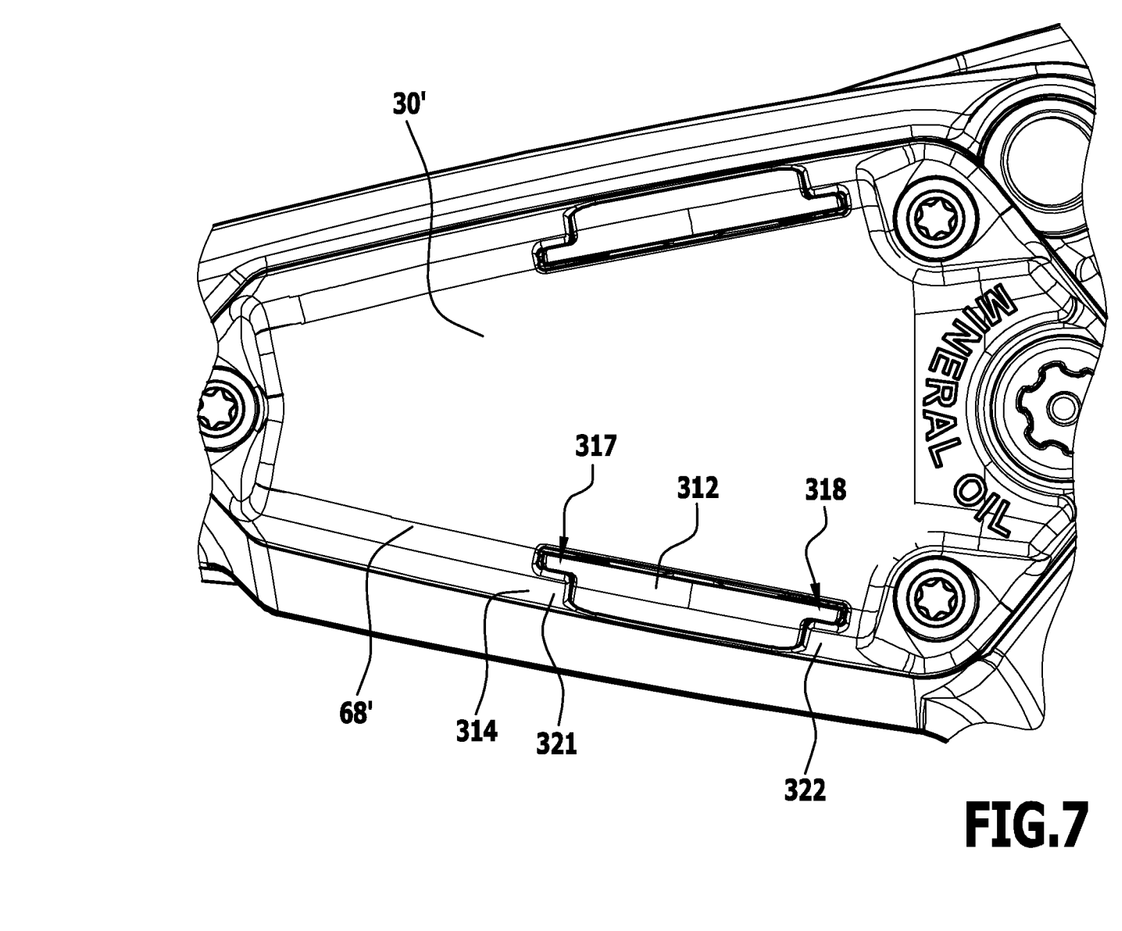
FIG. 7 shows an illustration, in the form of an enlarged detail, according to FIG. 4 in the region of the compensation reservoir.
Figure 8:
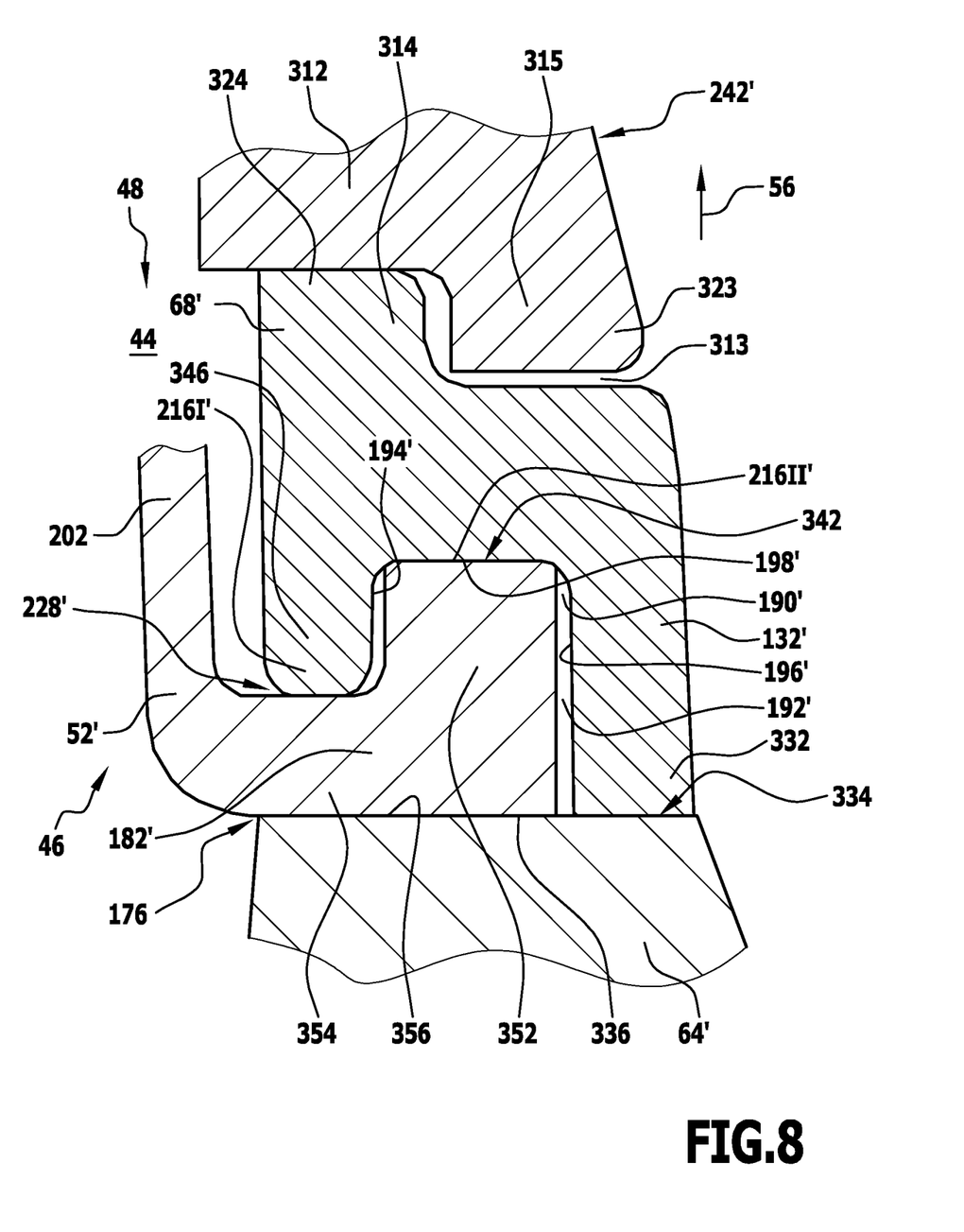
FIG. 8 shows an illustration, in the form of an enlarged detail, of a section according to FIG. 6 in a region of a side wall element of the compensation reservoir according to the second exemplary embodiment.

The transparent insert 312 is arranged so as to bear against the border 314 (FIGS. 6, 7 and 8).

In the direction of the direction 56 of extent of the compensation reservoir 30', the transparent insert 312 extends from a first end section 315 as far as a second end section 316 and, transverse to this, from a first side region 317 as far as a second side region 318.

In the side regions 317 and 318, the border 314 engages around the transparent insert 312 by way of holding elements 321 and 322, wherein the holding elements 321 and 322 hold the transparent insert 312 in the cutout 313.

In the side regions 317 and 318, the transparent insert 312 is arranged, at least in sections, between the interior 44 of the compensating container 30' and the border 314, and the border 314 in this way forms a stop for the transparent insert 312 in sections so that the transparent insert 312 does not slide away from the interior 44.

The transparent insert 312 lies on the side wall element 132' by way of the first end section 315.

The transparent insert 312 engages over a base section 324 of the border 314 by way of a lug 323, wherein the base section 324 is arranged between the interior 44 and the lug 323.

By way of example, the border 314 is formed as a step which rises in the direction of the direction 56 of extent in the region of the first end section 315, the raised portion of the said step facing the interior 44 and the lug 323 engaging over the raised portion of the step on a side which is averted from the interior 44.

The transparent insert 312 bears against the cover element 68' by way of the second end section 316.

The transparent insert 312 engages beneath the border 314 by way of a latching section 326, so that, in the direction of the direction 56 of extent, the transparent insert 312 is arranged, in particular clamped, between a region of the border 314, which region is arranged on the cover element 68', on the one hand and a region of the border 314, which region is arranged on the side wall element 132', on the other hand.

The side wall element 132' bears against a support section 336 of the base element 64' by way of an end section 332 in a contact region 334.

The side wall element 132' comprises a receptacle, which is designated 342 overall, for a sealing body 182' of the separating element 52'.

The receptacle 342 is in the form of a channel 190' with a channel opening 192' which faces the base element 64'.

Starting from the channel opening 192', an outer channel wall 196' and an inner channel wall 194' extend in a direction away from the base element 64' as far as a channel base 198' which connects the channel walls 194' and 196' and closes off the channel 190'.

Therefore, in this exemplary embodiment, the channel base 198' is arranged above the channel opening 192' in relation to the direction 56 of extent.

The inner channel wall 194' is arranged on a side of the channel 190' which faces the interior 44 of the compensation reservoir 30', and the outer channel wall 196' is arranged on a side which is situated opposite that side which faces the interior 44.

The outer channel wall 196' extends, starting from the channel 190', through the channel opening 192' as far as the end section 332 of the side wall element 132'.

The inner channel wall 194' forms a side of a projection 346 of the side wall element 132', which side is averted from the interior 44.

The projection 346 extends to a lesser extent in the direction of the base element 64' than the side wall element 132' by way of its end section 332 in the direction of the base element 64', so that a gap 228' is arranged between the projection 346 and the base element 64', in particular between the projection 346 and the bearing section 336 of the base element 64'.

The gap 228' is formed in the manner of a clearance between the projection 346 and the base element 64'.

The separating element 52' engages through the gap 228' and the sealing body 182' of the separating element 52' is arranged at least partially in the receptacle 342.

In addition, the sealing body 182' rests on the support section 336 of the base element 64'.

The sealing body 182' is situated in the channel 190' by way of a bead region 352.

In this case, the bead region 352 of the sealing body 182' extends through the channel opening 192' from the side wall element 132' as far as the base element 64', in particular from the channel base 198' as far as the support section 336 of the base element 64'.

The bead region 352 is connected to the diaphragm body 202 of the separating element 52' by way of a connecting section 354 of the sealing body 182'.

In this case, the connecting section 354 extends through the gap 228'.

The bead region 352 of the sealing body 182' is thicker than the connecting section 354.

In this case, the thickness of the sealing body 182', that is to say of the bead region 352 and of the connecting section 354, is measured transverse to a direction of extent of the sealing body 182' from the bead region 352 in the direction of the connecting section 354 as far as the diaphragm body 202.

That is to say, the thickness of the sealing body 182' and also of the bead region 352 and of the connecting section 354 relates to a cross section of the sealing body 182', wherein the cross section runs from the interior 44 of the compensation reservoir 30' to outside the compensation reservoir 30'.

In addition, the bead region 352 extends from a side which faces the base element 64' as far as a side which faces the side wall element 132' further than the connecting section 354 extends from a side which faces the base element 64' as far as a side which faces the side wall element 132'.

In this case, both the bead region 352 and the connecting section 354 rest on the support section 336 of the base element 64' by way of their side which faces the base element 64'.

In this exemplary embodiment, it is provided that a support surface 356 of the support section 336 for the sealing body 182' is substantially planar.

However, in one variant, it is provided that the support section 336 comprises, for example, a step or a receptacle for the sealing body 182'.

The side wall element 132' engages over, in particular, the bead region 352 of the sealing body 182', wherein the projection 346 of the side wall element 132' is arranged between the bead region 352 and the interior 44.

The side wall element 132' acts on the sealing body 182' and therefore the sealing body 182' is pressed between the side wall element 132' and the base element 64' and therefore forms the media-tight termination 176.

In this case, a large surface area of the sealing body 182' rests on the support section 336 of the base element 64', so that particularly expedient sealing off is performed.

The side wall element 132' acts on the sealing body 182', in particular the connecting section 354, by way of the projection 346, so that the projection 346 is also in the form of a pressure element 216I'.

In addition, the side wall element 132' acts on the sealing body 182', in particular the bead region 352, even in the receptacle 342.

In this case, the channel base 198' in particular presses on the bead region 352 of the sealing body 182', wherein the bead region 352 provides a large amount of sealing material for compression, so that particularly expedient sealing-off is achieved.

Therefore, a portion of the side wall element 132' is in the form of a further pressure element 216II' in the region of the channel base 198'.

Therefore, in the second exemplary embodiment, redundant sealing off is provided by the side wall element 132'.

Figure 9:
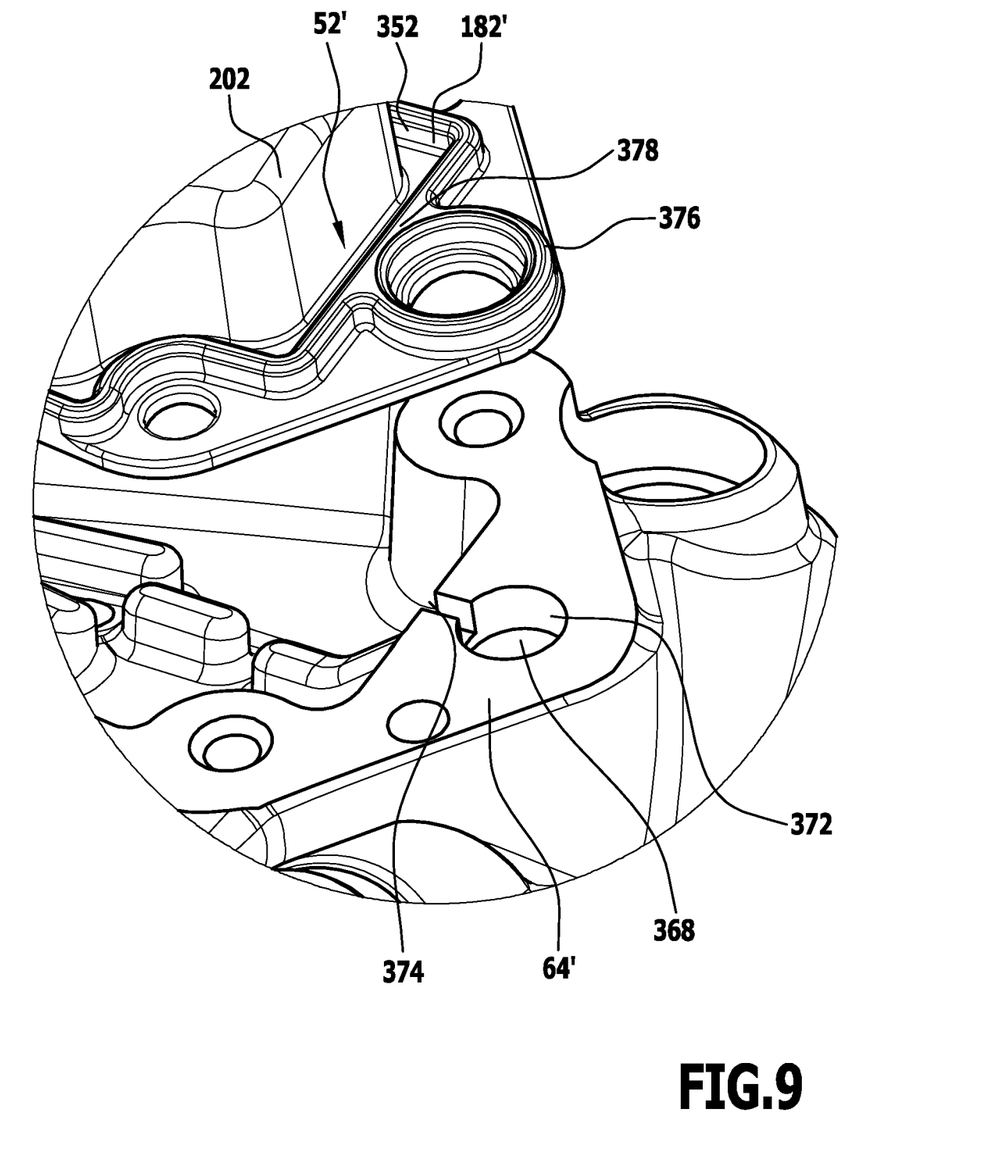
FIG. 9 shows an illustration, in the form of a detail, of a base element and a separating element in a region of an inlet duct.

The compensation reservoir 30' comprises an inlet apparatus 362 by means of which new hydraulic medium can be introduced into the storage chamber 46 and in this way the storage chamber 46 can be refilled with hydraulic medium.

The housing 40', in particular the cover element 68', comprises an inlet opening 364 which can be closed in a media-tight manner by way of a closure 366, and, if required, the closure 366 can be separated from the inlet opening 346 again and in this way the inlet opening 364 can be reopened.

The inlet opening 364 issues into an inlet duct 368 of the housing 40' which connects the inlet opening 364 to the storage chamber 46.

In this exemplary embodiment, the inlet duct 368 is arranged in the base element 64'.

In an inlet region 372, the inlet opening 364 issues into the inlet duct 368 which extends from the inlet region 372 as far as a mouth region 374 and issues into the storage chamber 46 in the mouth region 374.

In this exemplary embodiment, the inlet duct 368 is in the form of a recess in the base element 64', which recess passes from the inlet region 372 as far as the mouth region 374.

A seal 376 is provided in the inlet region 372 between the inlet opening 364, which is arranged on the cover element 68' for example, and the inlet duct 368, which is arranged in the base element 64' for example, for sealing-off purposes.

In this exemplary embodiment, the seal 376 is integrally formed with the separating element 52'.

In particular, a sealing-off section 378 of the separating element 52' extends from the mouth region 374 as far as the inlet region 372 over the inlet duct 368, which is in the form of a recess for example, and seals off the said inlet duct between the mouth region 374 and the inlet region 372.

Otherwise, all further parts in the second exemplary embodiment are identical to those of the first exemplary embodiment, and therefore reference can be made to the statements made in relation to the first exemplary embodiment.

The invention claimed is:

1. Compensation reservoir for a hydraulic operating system, comprising a housing in an interior of which a hydraulic storage chamber which is provided that contains hydraulic medium is bounded by a separating element which changes its shape in accordance with a volume of the hydraulic storage chamber, the housing engages over the separating element in a protective manner and defines an air chamber on an opposite side of the separating element of the hydraulic storage chamber, in that a filling level-indicating region of the separating element changes its position in the housing when the volume which is taken up by the hydraulic medium which is stored in the hydraulic storage chamber changes, and this position in each case represents a filling level-indicating position, and the filling level-indicating position which is situated within the housing is visible from outside the housing through the air chamber and through a viewing region of the housing, and wherein the hydraulic medium has direct contact with the housing.

2. Compensation reservoir according to claim 1, wherein the filling level-indicating position of the filling level-indicating region of the separating element is represented by the shape of the filling level-indicating region.

3. Compensation reservoir according to claim 1, wherein the filling level-indicating position of the filling level-indicating region of the separating element is represented by a relative position in relation to a marking or boundary of the viewing region.

4. Compensation reservoir according to claim 1, wherein the separating element is connected to a base element of the housing.

5. Compensation reservoir according to claim 4, wherein the hydraulic storage chamber is surrounded by the separating element and the base element.

6. Compensation reservoir according to claim 4, wherein a region of the base element is of tub-shaped design and the tub interior forms a subchamber of the hydraulic storage chamber.

7. Compensation reservoir according to claim 4, wherein a wall attachment of the base element, which wall attachment runs around a housing axis in a closed manner, forms a base region of a side wall of the housing.

8. Compensation reservoir according to claim 1, wherein the viewing region of the housing is arranged such that the air chamber is visible.

9. Compensation reservoir according to claim 1, wherein the viewing region of the housing runs away from a base element of the housing in one direction of extent.

10. Compensation reservoir according to claim 1, wherein the air chamber for expansion of the separating element is surrounded by a side wall element of the housing.

11. Compensation reservoir according to claim 10, wherein the side wall element is partially transparent.

12. Compensation reservoir according to claim 10, wherein the side wall element is completely transparent.

13. Compensation reservoir according to claim 10, wherein the side wall element comprises at least one transparent insert.

14. Compensation reservoir according to claim 1, wherein the separating element comprises a diaphragm body which is in the form of a dimensionally variable diaphragm or in the form of a bellows.

15. Compensation reservoir according to claim 1, wherein the separating element comprises a sealing body which seals off the hydraulic storage chamber at a transition between the separating element and the housing.

16. Compensation reservoir according to claim 15, wherein the sealing body and a diaphragm body of the separating element are integrally formed.

17. Compensation reservoir according to claim 15, wherein a bead region of the sealing body is arranged on the diaphragm body by way of a connecting section.

18. Compensation reservoir according to claim 17, wherein the bead region is thicker than the connecting section.

19. Compensation reservoir according to claim 15, wherein the sealing body comprises at least one sealing lip for forming a sealing line.

20. Compensation reservoir according to claim 15, wherein the sealing body comprises a plurality of sealing lips, each sealing lip being for forming a respective sealing line.

21. Compensation reservoir according to claim 15, wherein a base element of the housing has the receptacle for the sealing body of the separating element.

22. Compensation reservoir according to claim 1, wherein the housing has a receptacle for the separating element, in particular for the sealing body of the separating element.

23. Compensation reservoir according to claim 22, wherein the receptacle is designed in the form of a channel.

24. Compensation reservoir according to claim 22, wherein the sealing body in the receptacle is acted on by a pressure element and is deformed in relation to the state in which it is not acted on.

25. Compensation reservoir according to claim 22, wherein the at least one sealing lip bears against the receptacle in a sealing manner by virtue of the sealing body being acted on.

26. Compensation reservoir according to claim 22, wherein the plurality of sealing lips bear against the receptacle in a sealing manner by virtue of the sealing body being acted on.

27. Compensation reservoir according to claim 1, wherein the side wall element has the receptacle for the separating element for the sealing body of the separating element.

28. Compensation reservoir according to claim 1, wherein the sealing body is acted on by at least two pressure elements.

29. Compensation reservoir according to claim 28, wherein the pressure element is held on a side wall element of the housing.

30. Brake fitting of a steering device-controlled, vehicle, comprising a fitting housing of the brake fitting forming a portion of the housing of a compensation reservoir according to claim 1.

31. Brake fitting according to claim 30, wherein the fitting housing forms the base element of the compensation reservoir.

32. Compensation reservoir of claim 1, wherein the compensation reservoir is integrated into a hydraulic brake system or a clutch system.

33. Compensation reservoir for a hydraulic operating system, comprising a housing in an interior of which a storage chamber which is provided for storing hydraulic medium is bounded by a separating element which changes its shape in accordance with a volume of the storage chamber, the housing engages over the separating element in a protective manner, in that a filling level-indicating region of the separating element changes its position in the housing when the volume which is taken up by the hydraulic medium which is stored in the storage chamber changes, and this position in each case represents a filling level-indicating position, and the filling level-indicating position which is situated within the housing is visible from outside the housing through a viewing region of the housing, and wherein the viewing region comprises a UV filter.

* * * * *